United States Patent

[11] 3,549,804

[72] Inventors Lawrence E. Greenspan
Thorntons Ferry;
Earl J. Whitaker, Nashua, N.H.
[21] Appl. No. 797,830
[22] Filed Feb. 10, 1969
[45] Patented Dec. 22, 1970
[73] Assignee Sanders Associates, Inc.
Nashua, N.H.
a corporation of Delaware

[54] BIT SAMPLING IN ASYNCHRONOUS BUFFERS
13 Claims, 3 Drawing Figs.

[52] U.S. Cl. 178/69.5, 328/63, 328/72, 328/155
[51] Int. Cl. H04l 7/00
[50] Field of Search 178/69.5; 325/325; 328/63, 72, 155, 179; 179/15 Sync; 307/208, 269; 340/168

[56] References Cited
UNITED STATES PATENTS
3,185,963 5/1965 Peterson et al. 340/168
3,376,385 4/1968 Smith et al. 178/69.5

*Primary Examiner*—Robert L. Richardson
*Attorney*—Louis Etlinger

ABSTRACT: In an asynchronous serial by bit transmission of characters, as in teletype operation, no clock signal is transmitted with the data and a receiving device must supply its own timing. A clock signal is generated by means of an oscillator and counter arrangement. The oscillator is set to a frequency which is a multiple of *n* times the incoming data bit rate. The counter connected to the output of the oscillator then divides the oscillator frequency by *n* to provide a sampling pulse occurring at the midpoint of the received data bit, such that the maximum deviation of the sampling pulse from this midpoint is 1/*n*th of the data bit interval.

INVENTORS
LAWRENCE E. GREENSPAN
EARL J. WHITAKER
BY
ATTORNEY

BIT SAMPLING IN ASYNCHRONOUS BUFFERS

BACKGROUND OF THE INVENTION

1. Field of the Invention

The present invention relates generally to communications apparatus, and more particularly to means for synchronizing asynchronous serially transmitted data bits when no clock signal is received with the data.

2. Description of the Prior Art

In the prior art, various means have been used to generate sampling pulses for asynchronously transmitted data. One such prior method of sampling data is to let a start signal gate on an oscillator and use the oscillator output to generate sampling pulses for the following data. One disadvantage of this technique is the inherent unpredictable time interval between the start signal and the portion of the oscillator sign wave output which generates a sampling pulse. Because it is desirable to sample as near the midpoint of the data bit as possible, a device such as that of the present invention is necessary in that sampling occurs well within a tolerable deviation of the midpoint of the data bit.

Another prior art method is apparatus enabling the start pulse to trigger the first of a series of one shot multivibrators, one multivibrator for each of the following data intervals. The output of each of these multivibrators is then used to sample a data interval. One disadvantage of this technique is the cumulative error that can result from small misalignments of the individual delays of each multivibrator. For example, the sample pulse for the last data interval is dependent upon the adjustment of the delay in each of the preceding one shot multivibrators. Another disadvantage is the necessity for using as many multivibrators as there are data intervals in the received signal.

SUMMARY AND OBJECTS OF THE INVENTION

Accordingly, an object of this invention is to provide an improved means for sampling asynchronous transmission of bits in a signal.

Another object of this invention is to provide apparatus which samples bits of an asynchronous signal within a tolerable limit of the midpoint of each of the bits independent of the number of bits in the received signal.

Still another object of this invention is to provide apparatus which samples the incoming bits of the asynchronous signal, while insuring that the sampling pulse deviation from the midpoint of the bit interval will be no greater than $1/n$th of the data bit width.

Yet another object of the invention is to provide a system whereby the sampling pulses are resynchronized for each incoming signal.

A further object of this invention is to provide apparatus which accommodates various data bit rates by a simple adjustment.

Still a further object of this invention is to provide an accurate data receiving device capable of synchronizing asynchronous serial-by-bit transmission of characters, and including the further capability of detecting start and stop data bits of the incoming signals, and thereby transferring to an output device only the data bits between said start and stop signals.

Other objects will in part be obvious, and will in part appear hereinafter.

The invention accordingly comprises the features of construction, combination of elements and arrangement of parts which will be exemplified in the construction arranged herein, and the scope of the invention will be indicated in the claims.

Briefly, the invention is embodied in apparatus which provides for synchronizing bit sampling in the asynchronous serial-by-bit transmission of characters, each of which characters includes a plurality of bits. As in teletypelike communications apparatus, no clock signal is transmitted with the character bits, and the receiving device must provide its own timing so that the incoming bits will be synchronized with the operation of the receiving device. Accordingly, the synchronizing apparatus of the invention comprises an oscillator, the output frequency of which is $n$ times the frequency of the received bits of the asynchronous signal and a divide-by-$n$ counter, coupled to the output of the oscillator which provides a sampling pulse whose frequency is $1/n$th of the oscillator frequency and, therefore, identical to the frequency of the incoming character bits. The divide-by-$n$ counter is enabled to provide the sampling pulses following receipt of the first character bit called the "start" bit. Each sampling pulse, however, might be delayed, with reference to the midpoint of a data bit, which delay is governed by the state of the oscillator at the time the start bit is detected. That is, if the voltage level of the oscillator output is not at that level required to trigger the divide-by-$n$ counter, then the appearance of the sampling pulse will be delayed until the proper level is attained. The sampling pulse will deviate from the midpoint of the received data bit interval in proportion to the said delay incurred. Thus, by setting the oscillator at a frequency $n$ times that of the frequency of the received bits, the trigger level of the oscillator output will occur $n$ times in a received bit interval so that the deviation of the sampling pulse from the midpoint of the bit to be sampled will be a maximum of $1/n$th of the bit interval.

The transmitted signal or character such as those from a teletype consists of a start bit followed by data bits and terminated by two stop bits. The apparatus of the invention is also provided to detect the start and stop bits of the input signal. When a data bit is received, a ready command is sent to the peripheral device with which the apparatus of the invention is associated, indicating that data is ready for transfer to the peripheral device. By keeping track of the incoming data bits, the apparatus of the invention sends the input data to the peripheral device while inhibiting the transfer of the start and stop bits to the peripheral device.

BRIEF DESCRIPTION OF THE DRAWINGS

The foregoing and other objects, features and advantages of the invention will become apparent upon consideration of the following detailed description of a specific embodiment thereof, when taken in conjunction with the accompanying drawings, where.

DESCRIPTION OF THE PREFERRED EMBODIMENTS

Figure 1:
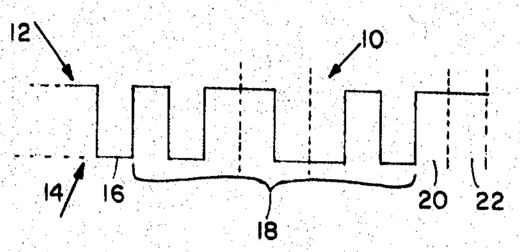
FIG. 1 is an illustration of a typical signal as used in teletype operation, and which will be received by the apparatus of the invention.

Now referring to FIG. 1, there is illustrated a standard teletype signal or character 10 having logic levels of one 12, and zero 14. The illustration is for so called "positive" logic, for "-negative" logic the signal 10 would be inverted. Start bit 16 is the first bit to be transmitted of signal 10. First stop bit 20 and second stop bit 22 are the last two bits of signal 10 and the data bits 18 are included between the start and stop bits in the standard teletype signal 10.

Typically, the teletype signal 10 may include 5, 6, 7 or 8 data bits 18. By way of example, 8 data bits 18 are employed for illustration. Prior to, and after transmission, of the signal 10 from the teletype apparatus, the logic level is in the logical one state 12. The start bit 16 is always a logical zero, followed by equally spaced data bits 18. The data bits may be either ones or zeros. After the last data bit, the logic level returns to a logical one state 12 for at least two bit intervals before the next character can be transmitted. These last two bit intervals are designated as STOP-1 bit 20 and STOP-2 bit 22.

Figure 3:
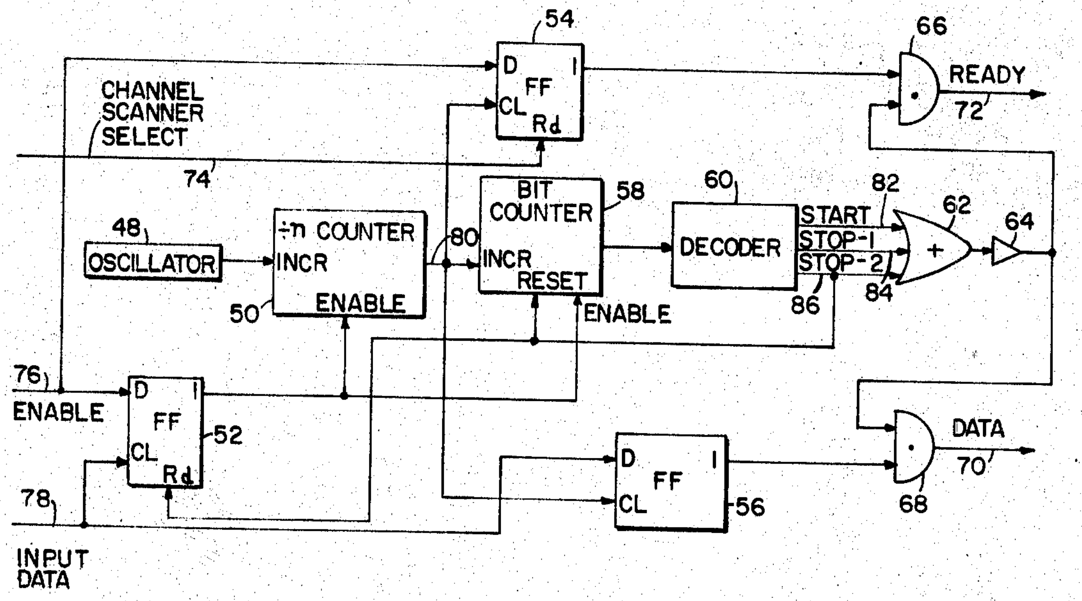
FIG. 3 is a schematic diagram of apparatus embodying the invention for synchronizing bit sampling in asynchronous serial-by-bit transmission of characters.

Now referring to FIG. 3, the operation of the apparatus embodying the invention will be described. The system will be started in operation by the receipt of an enable signal 76 from an external source either under program control of a communications processor or any connected peripheral device. Enable signal 76 will remain present as a logical one at D inputs of flip-flops FF 52 and FF 54 until all input data 78 corresponding to signal 10 is received.

It is noted at this point that FF 52, FF 54 and the other illustrated flip-flop FF 56 are D type trigger flip-flops. Such a flip-flop can be operated asynchronously using the $R_d$ input or the $S_d$ input (not shown) or synchronously using the combination of the D and CL inputs. When operating synchronously, the input information at the D input is transferred to the logical one output of the flip-flop on the occurrence of a pulse at the CL input, the pulse being called a clock pulse. It can, therefore, be seen that when the D input is low or a logical zero, the next clock pulse transfers this level so that the one output is made low or a logical zero. When the D input is a logical one, the next clock pulse makes the one output high or a logical one. An input pulse at the $R_d$ or $S_d$ inputs directly provides a logical zero or logical one, respectively, at the logical one output.

Figure 2:
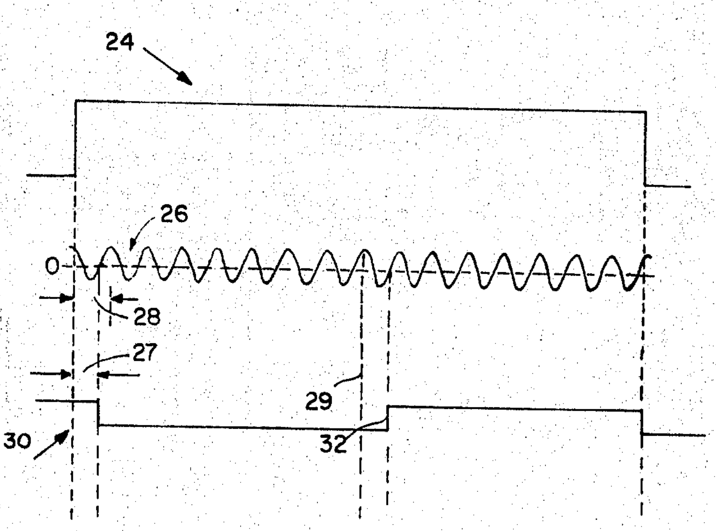
FIG. 2 is an illustration of one bit of the incoming signal in timed relationship with the oscillator output and sampling pulse provided in the invention.

When the leading edge of start bit 16 is received at FF 52, the divide-by-*n* counter 50 is enabled. Note that prior to the occurrence of the enable signal 76 and the leading edge of start bit 16, the divide-by-*n* counter 50 is forced to a reset condition by the low signal on the logical one output of FF 52. For purposes of explanation, let us assume that counter 50 divides the oscillator 48 output by 16. Other division numbers for counter 50 will be discussed later. The free running oscillator 48 generates a waveform 26 of period 28, illustrated as a sine wave in the timing diagram of FIG. 2. It is to be understood that waveform 26 could be another type waveform such as a square waveform. The sine wave 26, for the present example, has a frequency of 16 times the period of the bit interval as illustrated in FIG. 2 for a typical bit 24 of signal 10. Note that typical bit 24 would be either a logical one as shown or a logical zero, not shown. The frequency of sine wave 26 is divided by counter 50 to produce a sampling pulse 30, also shown in FIG. 2, on line 80 which has a frequency which is one-sixteenth the frequency of oscillator 48. Since counter 50 is enabled in response to the leading edge of the start bit 16, the leading edge 32 of sampling pulse 30, which occurs when counter 50 reaches the count of 8 ($n/2$ in general), is substantially coincident with the midpoint of the start bit interval and of the remaining bit intervals of the received signal 10 as shown in FIG. 2. The maximum deviation of the leading edge 32 from the midpoint 29 of the bit interval 24 is one-sixteenth of the bit interval. If the counter 50 is triggered or incremented on the positive-going zero crossover of waveform 26 and the bit 24 of signal 10 is received immediately after the positive-going zero crossover of waveform 26 has occurred, the maximum delay in triggering the counter 50 after receiving the start bit 16 will be one-sixteenth of the bit width. The encountered delay 27 is shown in FIG. 2 thereby similarly delaying leading edge 32 from midpoint 29.

If counter 50 were adjusted to divide by 32, and the oscillator 48 frequency were a factor of 32 times the signal bit frequency, the sampling pulse 30 would deviate from the midpoint by no more than one thirty-second of the bit interval. However, this would require additional logic circuitry. On the other hand, if counter 50 were set to divide by 8 and the oscillator 48 frequency were a factor of 8 times the signal bit frequency, the maximum error in deviation would increase to one-eighth of the bit interval. The exemplary divide-by-16 counter is essentially a compromise between cost and accuracy in sampling. The use of a divide-by-16 counter should not be interpreted as restrictive, and it should be appreciated that this system may utilize a counter 50 and oscillator 48 with any frequency ratio as the situation warrants.

As the case with the divide by *n* counter 50, prior to the triggering of FF 52 to the one state, bit counter 58 was held in a reset condition by the low signal on the logical one output of FF 52 at the counter 58 Enable input. The sampling pulse on line 80 increments the bit counter 58, sets a ready flip-flop 54, and loads the data signal 10 on input data line 78 into the data flip-flop 56. The bit counter 58 is always reset before a character or signal is received. The outputs of counter 58 are decoded by decoder 60 to produce a start bit on line 82 upon the receipt of start bit 16 (FIG. 1). In a similar manner, a STOP-1 bit on line 84 and a STOP-2 bit on line 86 are generated by stop bits 20 and 22 (FIG. 1) respectively. The decoder 60, which might be built with AND gates, is a type generally known in the art, and is provided to detect, in this example, the first, 10th and 11th bits of the incoming signal 10. During the occurrence of the first, tenth and eleventh bits, and gate 66 is disabled by the combination of OR gate 62 and inverting amplifier 64. That is, the detected logical one output of decoder 60 is passed through OR gate 62 and is converted to a logical zero level at the output of inverting amplifier 64. AND gate 66 having a logical zero on one of its inputs will not be fully conditioned and a ready pulse 62 used to enable the peripheral device for receipt of data will not be sent to the peripheral device associated with the apparatus of the invention. Data AND gate 68 is similarly disabled from passing data during the presence of the start and two stop bits received via data FF 56 to the peripheral device on data line 70.

When data bits 18 are received, they will be synchronized and transferred to the peripheral device in the following manner. If the peripheral device associated with the apparatus of the invention is a communications processor which includes a plurality of input data channels addressed by a scanning control arrangement, then the device will transmit a channel scanner select pulse in response to the ready signal 72 whereupon the received data bit stored in FF 56 is transferred to the device and FF 54 is reset causing ready signal 72 to go low. The channel scanner select pulse 74 may be, for example, in the case of a computer system, a pulse generated by the computer during a memory cycle devoted to I/0 data transfer. The peripheral device then, will transmit a channel scanner select pulse 74 t the direct reset input of FF 54. Assuming, now that the enable signal 76 is high and that the start bit 16 has passed and was blocked at AND gates 66 and 68 by the inverter, 64, the next sampling pulse on line 80 will clock FF 54 thereby providing a pulse at the logical one output and fully condition AND gate 66 so that a ready pulse 72 is sent to the peripheral device. Note that, the other input to AND gate 66 has already become a logical one due to the fact that bit counter 58 was incremented to position 2, indicating the presence of the second bit of the incoming signal or the first data bit of bits 18, and that the decoder 60 has logical zero levels on each of its output lines 82, 84 and 86 which were converted to a logical one by means of inverting amplifier 64.

As noted previously, the channel scanner select pulse 74 only occurs in response to ready 72, when said ready 72 indicates to the peripheral device that a data bit, stored in FF 56, is ready to be input to the peripheral device. During the period that the channel scanner select pulse 74 is absent, FF 54 remains reset until a sampling pulse on line 80 clocks FF 54 and FF 56, thereby raising ready 72 and transferring the input data 78 via FF 56 to the output data line 70. This occurs because AND gate 66 which had been partially conditioned by the output of inverting amplifier 64 is fully conditioned by the logical one output of FF 54. The AND gate 68 which had been partially conditioned by the output of inventing amplifier 64 is fully conditioned by FF 56 which tracks the input data in the following manner. When input data 78 is a logical one, it is clocked into FF 56 by the sampling pulse on line 80 and passes through onto the data line 70 as a logical one; when data 78 is a logical zero, FF 56 tracks to a logical zero and passes through onto data line 70 as a logical zero. With ready 72 now raised, channel scanner select pulse 74 will then reset FF 54 thereby disabling ready line 72 and, at the same time, data 70 will be accepted by the peripheral device. In a peripheral device which uses a scanning arrangement, the next data bit 18 of signal 10 will not pass through to the peripheral device until the pulse 74 is again generated in response to the next ready 72.

The seven remaining data bits will pass through to the peripheral device in a similar manner as just mentioned above. Due to the inherent nature of a teletype system two stop signals are necessary. However, it can be seen that one stop signal could be used in this system just as well. The second stop signal on line 86 will reset bit counter 58 and directly reset FF 52, thereby disabling counter 50 and placing the circuit in a condition ready to receive the next incoming signal 10 on input data line 78.

It can be readily seen that this system can be adapted to any incoming bit rate by a simple adjustment of oscillator 48 provided that, the period of the signal out of oscillator 48 is made equal to one-sixteenth of the bit width where a divide-by-16 counter 50 is used. If a divide-by-32 counter 50 is used the period of the signal out of oscillator 48 must be made to equal one thirty-second of the bit width. In more generic terms, if the counter 50 is a divide-by-$n$ counter the period of the signal out of oscillator 48 must be made to equal $1/n$th of the bit width.

It can also be seen that an advantage of this system is the use of a scheme whereby the synchronizing of subsequent data bits results from resynchronizing the sampling pulses for each incoming signal 10. Thus, if by some chance a first signal 10 is not synchronized, a subsequent signal 10 will not necessarily fall out of synchronization. It also has been seen that an advantage of this system is in the use of a scheme whereby sampling pulses will not deviate from the midpoint of the incoming asynchronous data bit by more than $1/n$th of the bit width. Means have also been shown whereby the apparatus of this invention may be used in communications channels arranged in a general scanning arrangement.

It will thus be seen that the objects set forth above, among those made apparent from the preceding description, are efficiently attained and since certain changes may be made without departing from the scope of the invention, it is intended that all matter should be interpreted as illustrative and not in a limiting sense.

We claim:

1. Apparatus for sampling at least one bit of a signal input, comprising:
   A. means for producing a timing signal having a frequency of $n$ times the frequency of said bit to be sampled;
   B. means, coupled to said timing signal producing means, for dividing said timing signal frequency by $n$ to generate sampling pulses;
   C. means enabling said dividing means upon the occurrence of one bit to be sampled; and
   D. means, coupled to said signal input, synchronizing said one bit upon the occurrence of said sampling pulse, whereby said pulse samples said bit at a point no greater than $1/n$ from the midpoint of said bit.

2. Apparatus as defined in claim 1 wherein said dividing means is enabled upon the leading edge of said one bit to be sampled.

3. Apparatus as defined in claim 2 wherein:
   A. said at least one bit is one of a plurality of bits of said signal to be sampled; and
   B. said dividing means also produces sampling pulses for each of the bits which succeed said at least one pulse such that each such succeeding bit is sampled at a point which deviates from the midpoint of each of said bits by a maximum of $1/n$ of said bit period independent of the number of bits in said character.

4. Apparatus as defined in claim 3 further including means for detecting a first bit and a last bit of said bits in said signal, said detecting means coupled to the output of said dividing means.

5. Apparatus as defined in claim 4 wherein:
   A. said apparatus has an output; and
   B. control means are provided to control the transfer of bits of said signal from the synchronizing means to said output.

6. Apparatus as defined in claim 5 wherein said means for controlling includes:
   A. means for inhibiting said transfer of said first and last bits; and
   B. means for enabling said transfer of said bits occurring between said first and last bits.

7. Apparatus as defined in claim 6 wherein said means for controlling further includes means for generating a ready signal when said inbetween bits are ready for transfer.

8. Apparatus as defined in claim 7 wherein said detected last bit of said signal conditions said detecting means and said enabling means for receipt of a subsequent signal.

9. Apparatus as defined in claim 8 wherein said means for generating said ready signal is selectively disabled.

10. Apparatus for synchronizing bit sampling in asynchronous serial-by-bit transmission of characters, comprising:
    A. an oscillator whose output frequency is $n$ times the frequency of said bits of said transmitted character;
    B. means, connected to the output of said oscillator, for generating a sampling pulse whose frequency is $1/n$ of said oscillator frequency;
    C. means enabling said generating means upon the leading edge of the first bit of said bits to be sampled whereby said sampling pulse:
       1. occurs at the midpoint of each of said bits independent of the number of bits in said character, and
       2. deviates from said midpoint by a maximum of $1/n$ of the width of said bits; and
    D. means for sampling said bits upon the occurrence of said sampling pulse, whereby said bits are synchronized with said sampling pulses.

11. Apparatus as in claim 10 wherein said apparatus for synchronizing bit sampling further includes:
    A. means for detecting a start bit of said character;
    B. means for detecting a stop bit of said character;
    C. means for generating an enabling signal when said data bits between said start bit and said stop bit are received; and
    D. means for transferring said data bits to the output of said sampling means upon the occurrence of:
       1. said enabling signal, and
       2. said sampling pulse.

12. Apparatus as in claim 11 wherein said means for detecting said start and stop bits comprises:
    A. means for counting said bits upon the occurrence of said sampling pulse;
    B. means for detecting the position of said bits in said character indicative of said start and stop bits; and
    C. means for resetting said counting means and said generating means upon the occurrence of said stop bit and before said next character.

13. Apparatus for synchronizing bit sampling in asynchronous serial-by-bit transmission of characters, comprising:
    A. an oscillator whose output frequency is $n$ times the frequency of said bits to be sampled;
    B. means, coupled to said oscillator output, for dividing said oscillator output frequency by $n$ to generate a sampling pulse;
    C. means enabling said dividing means upon the occurrence of the first bit of said bits to be sampled whereby said sampling pulse:
       1. occurs at the midpoint of each of said bits independent of the number of bits in said character, and
       2. deviates from said midpoint by a maximum of $1/n$ of the width of said bits;
    D. means synchronizing said bits upon the occurrence of said sampling pulse; and
    E. control means coupled to the output of said dividing means, said control means including:
       1. means for transferring said bits to the output of said synchronizing means upon the occurrence of said sampling pulse;
       2. means for detecting a first bit and last bit of said bits in said character;

3. means for transferring said bits occurring between said first and last bits and inhibiting the transfer of said first and last bits; and
4. means for conditioning said apparatus for receipt of a subsequent character after said last bit of a prior character has been transferred.